(12) United States Patent
Oh

(10) Patent No.: US 11,997,386 B2
(45) Date of Patent: May 28, 2024

(54) CAMERA MODULE AND OPTICAL DEVICE

(71) Applicant: LG INNOTEK CO., LTD., Seoul (KR)

(72) Inventor: Young Don Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 300 days.

(21) Appl. No.: 17/602,454

(22) PCT Filed: Apr. 3, 2020

(86) PCT No.: PCT/KR2020/004546
§ 371 (c)(1),
(2) Date: Oct. 8, 2021

(87) PCT Pub. No.: WO2020/213862
PCT Pub. Date: Oct. 22, 2020

(65) Prior Publication Data
US 2022/0217278 A1  Jul. 7, 2022

(30) Foreign Application Priority Data

Apr. 17, 2019 (KR) .................... 10-2019-0044716

(51) Int. Cl.
*H04N 23/68* (2023.01)
*H04N 23/55* (2023.01)
(52) U.S. Cl.
CPC ........... *H04N 23/687* (2023.01); *H04N 23/55* (2023.01); *H04N 23/6812* (2023.01)

(58) Field of Classification Search
CPC .......... G03B 5/00; H04N 23/55; H04N 23/57; H04N 23/6812; H04N 23/687
See application file for complete search history.

(56) References Cited

U.S. PATENT DOCUMENTS

| 9,232,138 | B1 | 1/2016 | Baldwin | |
| 11,683,588 | B2* | 6/2023 | Tabuchi | H02K 41/0356 |
| | | | | 348/208.2 |
| 2011/0317988 | A1* | 12/2011 | Lee | G03B 13/34 |
| | | | | 396/61 |
| 2016/0212332 | A1 | 7/2016 | Tang et al. | |
| 2016/0227120 | A1 | 8/2016 | Lee et al. | |
| 2017/0064217 | A1* | 3/2017 | Ota | H04N 23/62 |
| 2017/0082866 | A1 | 3/2017 | Kim | |
| 2017/0126978 | A1 | 5/2017 | Yun | |

(Continued)

FOREIGN PATENT DOCUMENTS

| CN | 193187237 A | 6/2013 |
| CN | 103533230 A | 1/2014 |
| CN | 105049882 A | 11/2015 |

(Continued)

*Primary Examiner* — Amy R Hsu
(74) *Attorney, Agent, or Firm* — Birch, Stewart, Kolasch & Birch, LLP

(57) ABSTRACT

An embodiment comprises: an image sensor; a moving part including a lens and disposed on the image sensor; a fixed part; an elastic member connecting the fixed part and the moving part; and a control part which obtains a correction value for compensating for the amount of tilt of the moving part when the moving part is tilted due to gravity, and uses the correction value to control the movement of the moving part.

20 Claims, 12 Drawing Sheets

(56) References Cited

U.S. PATENT DOCUMENTS

2018/0184005 A1\* 6/2018 Morotomi .......... H04N 23/6812
2019/0182425 A1\* 6/2019 Kim ................... G08B 13/1963

FOREIGN PATENT DOCUMENTS

| KR | 10-1051509 B1 | 7/2011 |
| KR | 10-2016-0031765 A | 3/2016 |
| KR | 10-2016-0093299 A | 8/2016 |
| KR | 10-1657283 B1 | 9/2016 |
| KR | 10-2017-0050912 A | 5/2017 |

\* cited by examiner

FIG.6A

| $\theta_z$ | CORRECTION VALUE | |
|---|---|---|
| | X-AXIS TILT ANGLE | Y-AXIS TILT ANGLE |
| 90° | A1 | B1 |
| 15° | A2 | B2 |
| 30° | A3 | B3 |
| 45° | A4 | B4 |
| 60° | A5 | B5 |

FIG.6B

| $\theta_z$ | X-AXIS OC VARIATION | Y-AXIS OC VARIATION |
|---|---|---|
| 90° | dx | dy |
| 15° | dx1 | dy1 |
| 30° | dx2 | dy2 |
| 45° | dx3 | dy3 |
| 60° | dx4 | dy4 |

| θ_z | X-AXIS OC VARIATION | Y-AXIS OC VARIATION | X-AXIS DEFAULT VARIATION | Y-AXIS DEFAULT VARIATION |
|---|---|---|---|---|
| 90° | dx | dy | dPx | dPy |
| 15° | dx1 | dy1 | dPx1 | dPy1 |
| 30° | dx2 | dy2 | dPx2 | dPy2 |
| 45° | dx3 | dy3 | dPx3 | dPy3 |
| 60° | dx4 | dy4 | dPx4 | dPy4 |

CAMERA MODULE AND OPTICAL DEVICE

CROSS REFERENCE TO RELATED APPLICATIONS

This application is the National Phase of PCT/KR2020/004546 filed on Apr. 3, 2020, which claims priority under 35 U.S.C. § 119(a) to Patent Application No. 10-2019-0044716 filed in the Republic of Korea on Apr. 17, 2019, all of which are hereby expressly incorporated by reference into the present application.

TECHNICAL FIELD

Embodiments relate to a camera module and an optical device including the same.

BACKGROUND ART

Voice coil motor (VCM) technology, which is used in conventional general camera modules, is difficult to apply to a micro-scale camera module, which is intended to exhibit low power consumption, and study related thereto has been actively conducted.

There is increasing demand for, and production of, electronic products such as smart phones and cellular phones equipped with cameras. Cameras for cellular phones have been increasing in resolution and decreasing in size, and accordingly, an actuator therefor is also becoming smaller, larger in diameter, and more multifunctional. In order to realize a high-resolution cellular phone camera, improvement in the performance of the cellular phone camera and additional functions, such as autofocusing, shutter shaking prevention, and zooming in and out, are required.

DISCLOSURE

Technical Problem

Embodiments provide a camera module and an optical device including the same capable of compensating for deviation of the optical center of a lens-moving unit due to gravity during hand-tremor compensation, thus preventing deterioration in resolution and improving the accuracy of hand-tremor compensation.

Technical Solution

A camera module according to an embodiment includes an image sensor, a moving unit including a lens, the moving unit being disposed on the image sensor, a fixing unit, an elastic member interconnecting the fixing unit and the moving unit, and a controller configured to, when the moving unit is tilted by gravity, acquire a correction value to compensate for the extent of tilting of the moving unit and to control movement of the moving unit using the correction value.

The camera module may include a motion sensor, and the controller may acquire posture information on the moving unit using sensing information of the motion sensor.

The posture information on the moving unit may include a tilt angle of a reference axis at the current position of the moving unit with respect to the reference axis at a reference position, and the reference position may be a position at which the reference axis, perpendicular to a sensor surface of the image sensor, is parallel to the direction of gravity.

The camera module may include a memory storing correction value information on the moving unit corresponding to the posture information on the moving unit, and the controller may acquire the correction value using the posture information on the moving unit and may compensate for the extent of tilting of the moving unit.

The correction value information on the moving unit stored in the memory may include at least one of the extent of tilting of the moving unit and variation in the position of an optical center of the moving unit.

The controller may control the moving unit to move in a direction perpendicular to an optical axis in order to perform hand-tremor compensation.

During the hand-tremor compensation, the correction value may be used to compensate for hand tremor.

The controller may compensate for the extent of tilting of the moving unit, and may perform the hand-tremor compensation.

In addition, in order to perform the hand-tremor compensation, the controller may calculate target position information on the moving unit using the correction value, may acquire current position information on the moving unit, may acquire error information for hand-tremor compensation based on the target position information and the current position information on the moving unit, and may control the moving unit to move in a direction perpendicular to the optical axis based on the error information.

The controller may receive acceleration information on the camera module, and may acquire the posture information on the moving unit using the received acceleration information on the camera module.

The controller may acquire the extent of tilting of the moving unit using Z-axis acceleration of the camera module.

The camera module may include an OIS position sensor disposed at the fixing unit and configured to output an output signal in response to the result of sensing the movement of the moving unit in a direction perpendicular to the optical axis to the controller, and the controller may acquire the current position information on the moving unit based on the output signal of the OIS position sensor.

The controller may include a look-up table storing correction value information corresponding to preset respective pieces of posture information on the moving unit, and the controller may acquire the correction value of the moving unit corresponding to the acquired posture information on the moving unit using the look-up table.

The correction value information may include a tilt angle of the moving unit.

The correction value information may include variation between the position of the optical center of the moving unit at the reference position and the position of the optical center of the moving unit at the current position.

The correction value information may include default variation, which is variation in the position of the optical center of the moving unit when the moving unit is tilted by a reference angle in the direction of gravity in the preset posture information.

The controller may include a correction value generator configured to generate the correction value using the acquired posture information on the moving unit, a target position calculator configured to calculate target position information on the moving unit based on the correction value, a position detector configured to detect position information on the moving unit, a driving signal generator configured to generate a driving control signal using the target position information on the moving unit and the position information on the moving unit, and a driver configured to control the movement of the moving unit in a direction perpendicular to the optical axis based on the driving control signal.

Advantageous Effects

Embodiments are capable of compensating for deviation of the optical center of a lens-moving unit due to gravity during hand-tremor compensation, thereby preventing deterioration in resolution and improving the accuracy of hand-tremor compensation.

DESCRIPTION OF DRAWINGS

FIG. 6A illustrates an example of correction value information stored in a correction value generator.

FIG. 6B illustrates another example of correction value information stored in the correction value generator.

BEST MODE

Figure 1:
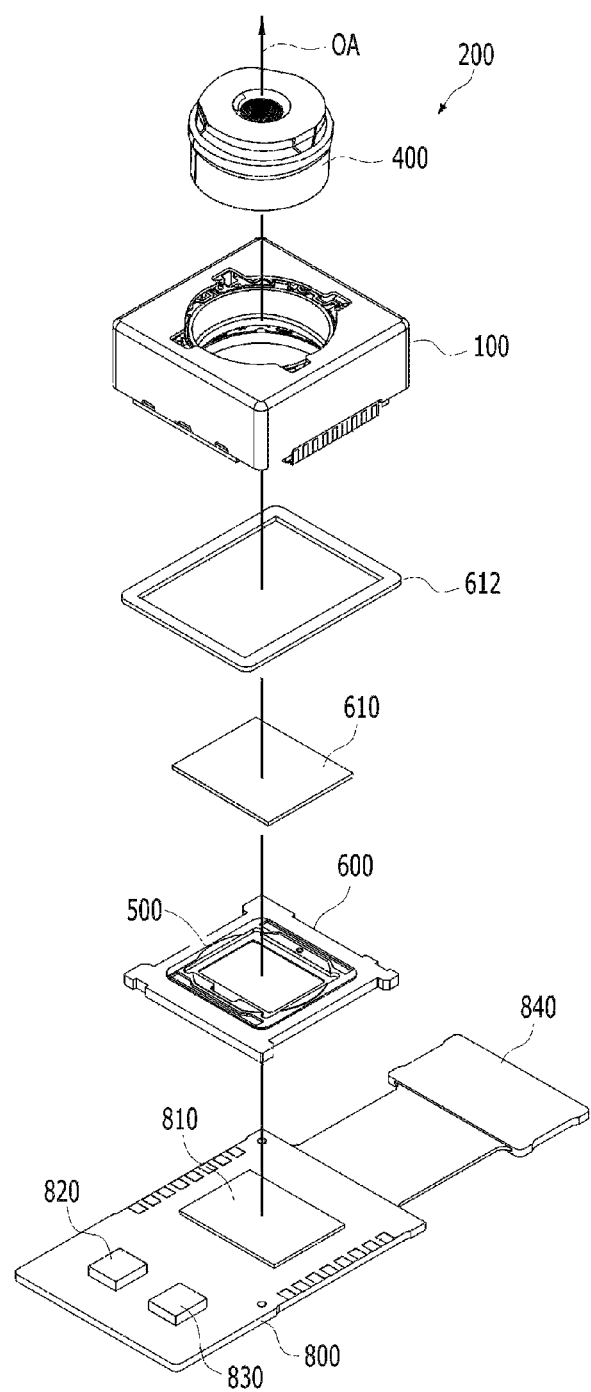
FIG. 1 is an exploded perspective view of a camera module according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, a camera module and an optical device including the same according to embodiments will be described with reference to the accompanying drawings. For convenience of description, the camera module will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the optical-axis direction, may be referred to as a "first direction", the x-axis direction may be referred to as a "second direction", and the y-axis direction may be referred to as a "third direction".

The camera module according to the embodiment may perform an "autofocusing function". Here, the autofocusing function is a function of automatically focusing an image of a subject on the surface of an image sensor.

In addition, the camera module according to the embodiment may perform a "hand-tremor compensation function". Here, the hand-tremor compensation function is a function of inhibiting the contour of a captured still image from being blurred due to vibration caused by shaking of a hand of a user when capturing the still image.

Hereinafter, a lens-moving unit may be referred to as a lens-moving apparatus, a voice coil motor (VCM), or an actuator. Hereinafter, the term "coil" may be interchanged with "coil unit", the term "elastic member" may be interchanged with "elastic unit" or "spring", and the term "support member" may be interchanged with "wire" or "spring".

In addition, the term "terminal" may be interchanged with "pad", "electrode", "conductive layer", or "bonding unit".

FIG. 1 is an exploded perspective view of a camera module 200 according to an embodiment.

Referring to FIG. 1, the camera module 200 may include a lens module 400, a lens-moving unit 100, an adhesive member 612, a filter 610, a holder 600, a circuit board 800, an image sensor 810, a motion sensor 820, a controller 830, and a connector 840.

The lens module 400 may be mounted in a bobbin 110 of the lens-moving unit 100. The lens module 400 may include a plurality of lenses. Alternatively, the lens module 400 may include a plurality of lenses and a lens barrel in which the lenses are mounted.

The holder 600 may be disposed under a base 210 of the lens-moving unit 100.

The holder 600 may be referred to as a "sensor base", and may be omitted in another embodiment.

The filter 610 may be mounted to the holder 600, and the holder 600 may include a seating portion 500 on which the filter 610 is seated. For example, the seating portion 500 may have a structure protruding from the upper surface of the holder 600, without being limited thereto. In another embodiment, the seating portion 500 may be formed in the shape of a recess that is depressed from the upper surface of the holder 600.

The adhesive member 612 may couple or attach the base 210 of the lens-moving unit 100 to the holder 600. The adhesive member 612 may serve not only to bond components, as described above, but also to prevent foreign substances from entering the lens-moving unit 100.

For example, the adhesive member 612 may be an epoxy, a thermosetting adhesive, or an ultraviolet-curable adhesive.

The filter 610 may serve to block light in a specific frequency band, among the light passing through the lens module 400, from entering the image sensor 810. The filter 610 may be an infrared cut-off filter, without being limited thereto. In this case, the filter 610 may be disposed parallel to the x-y plane.

An opening may be formed in a portion of the holder 600, to which the filter 610 is mounted, so as to allow light passing through the filter 610 to enter the image sensor 810.

The circuit board 800 may be disposed under the holder 600, and the image sensor 810 may be disposed on or mounted on the circuit board 800. The image sensor 810 is a part on which the light that has passed through the filter 610 is incident and in which an image included in the light is formed.

The circuit board 800 may be provided with various circuits, elements, and controllers in order to convert an image formed by the image sensor 810 into an electrical signal and to transmit the electrical signal to an external device.

A circuit pattern and a plurality of terminals may be formed on the circuit board 800. For example, the circuit board 800 may be implemented as a printed circuit board or a flexible printed circuit board, without being limited thereto.

The image sensor 810 may be electrically connected to the circuit board 800, and may include an active area AR or an effective area, which receives an image included in the light incident thereon through the lens-moving unit 100 and converts the received image into an electrical signal.

The filter 610 and the image sensor 810 may be spaced apart from each other so as to be opposite each other in the first direction.

The motion sensor 820 may be disposed on or mounted on the circuit board 800, and may be electrically connected to the controller 830 via the circuit pattern provided on the circuit board 800.

The motion sensor 820 outputs rotating angular speed information and acceleration information according to the motion of the camera module 200.

The motion sensor 820 may sense a change in the angular speed according to the motion of the camera module 200 and the position of the lens-moving unit 100, which is moved in response to the motion of the camera module 200.

The motion sensor 820 may include a 3-axis gyro sensor, an angular speed sensor, and/or an acceleration sensor, or may include an inertial measurement unit (IMU).

In another embodiment, the motion sensor 820 may be omitted from the camera module 200, and may be mounted in an optical device. In still another embodiment, motion sensors may be mounted in both the camera module and the optical device.

The controller 830 is disposed on or mounted on the circuit board 800.

The controller 830 may be electrically connected to the circuit board 800, and the circuit board 800 may be electrically connected to a circuit board 250 of the lens-moving unit 100.

The controller 830 may be electrically connected to a first coil 120 and a second coil of the lens-moving unit 100.

In addition, the controller 830 may be electrically connected to an AF position sensor and an optical image stabilizer (OIS) position sensor.

The controller 830 may provide a driving signal to each of the first coil 120 and the second coil. In addition, the controller 830 may provide a driving signal to each of the AF position sensor and the OIS position sensor, and may receive output from each of the AF position sensor and the OIS position sensor.

For example, the controller 830 may control a driving signal for performing hand-tremor compensation on an OIS operation unit (or an OIS unit) of the lens-moving unit 100 based on the angular speed data provided from the motion sensor and the output signal provided from the OIS position sensor of the lens-moving unit 100.

The connector 840 may be electrically connected to the circuit board 800, and may include a port to be electrically connected to an external device.

Figure 2:
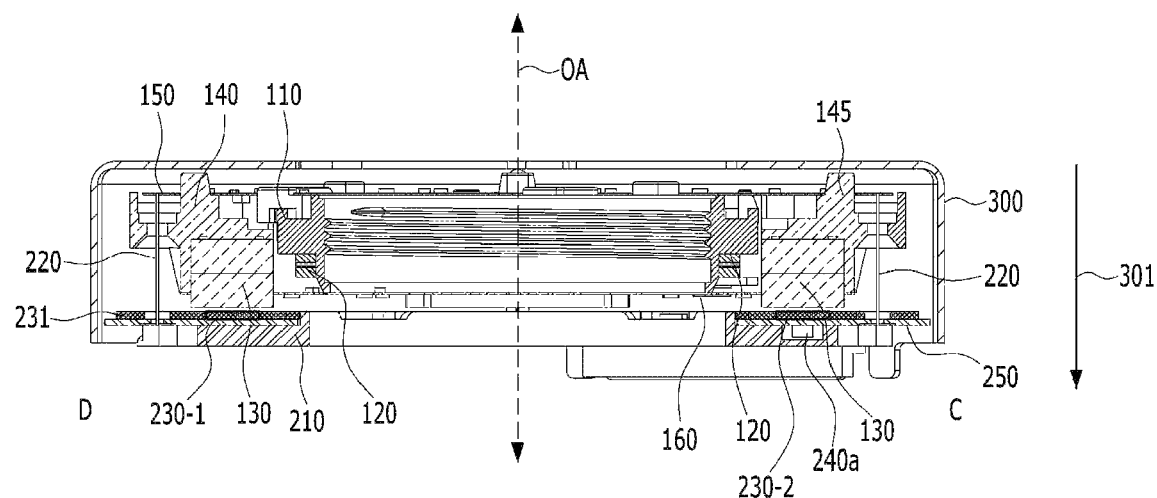
FIG. 2 is a cross-sectional view of an embodiment of the lens-moving unit shown in FIG. 1.

FIG. 2 is a cross-sectional view of an embodiment of the lens-moving unit 100 shown in FIG. 1.

Referring to FIG. 2, the lens-moving unit 100 may move the lens module 400.

The lens-moving unit 100 may include a bobbin 110, a first coil 120, a magnet 130, a housing 140, an upper elastic member 150, a lower elastic member 160, a support member 220, a second coil, and optical image stabilization (OIS) position sensors 240a and 240b.

In addition, the lens-moving unit 100 may further include a base 210, a circuit board 250, and a cover member 300.

The bobbin 110 may be disposed inside the housing 140, and may be moved in the direction of the optical axis OA or the first direction (e.g. the Z-axis direction) by the electromagnetic interaction between the first coil 120 and the magnet 130.

The bobbin 110 may have an opening formed therein to allow the lens or the lens barrel to be mounted therein.

The bobbin 110 may include a first stopper protruding from the upper surface thereof. In addition, the bobbin 110 may include a second stopper protruding from the lower surface thereof.

The bobbin 110 may be provided at the upper portion or the upper surface thereof with a first coupling portion to allow the upper elastic member 150 to be coupled and secured thereto, and may be provided at the lower portion or the lower surface thereof with a second coupling portion to allow the lower elastic member 160 to be coupled and secured thereto. For example, each of the first and second coupling portions of the bobbin 110 may have the shape of a protrusion, a recess, or a plane.

In an example, the bobbin 110 may have a seating recess formed in the outer surface thereof to allow the first coil 120 to be seated, inserted, or disposed therein, without being limited thereto.

The first coil 120 is disposed at the bobbin 110. In an example, the first coil 120 may be disposed on the outer surface of the bobbin 110.

For example, the first coil 120 may have the shape of a closed loop, a coil block, or a coil ring so as to be disposed on the outer surface of the bobbin 110. In an example, the first coil 120 may be implemented in the form of a coil ring that is wound around the outer surface of the bobbin 110 about the optical axis, without being limited thereto. In another embodiment, the first coil may be implemented in the form of a coil ring that is wound about a straight line perpendicular to the optical axis.

A driving signal may be provided to the first coil 120. At this time, the provided driving signal may be a direct-current signal or an alternating-current signal, or may include a direct-current signal and an alternating-current signal, and may have the form of voltage or current.

When a driving signal (e.g. driving current) is supplied to the first coil 120, electromagnetic force may be formed through the interaction between the first coil 120 and the magnet 130, and an AF operation unit (e.g. the bobbin 110) may be moved in the first direction (e.g. the z-axis direction), or may be tilted by the formed electromagnetic force.

At the initial position of the AF operation unit, the AF operation unit (e.g. the bobbin 110) may be moved in an upward direction or a downward direction, which is referred to as bidirectional driving of the AF operation unit. Alternatively, at the initial position of the AF operation unit, the AF operation unit (e.g. the bobbin 110) may be moved in the upward direction, which is referred to as unidirectional driving of the AF operation unit.

For example, the AF operation unit may include the bobbin 110 and components coupled to the bobbin 110 (e.g. the first coil 120).

The initial position of the AF operation unit may be the original position of the AF operation unit in the state in which no power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

The housing 140 accommodates the bobbin 110 therein and supports the magnet 130.

The housing 140 may generally have a hollow pillar shape. For example, the housing 140 may have a polygonal (e.g. quadrangular or octagonal) or circular opening formed therein to allow the bobbin 110 to be mounted or disposed therein, and the opening in the housing 140 may be a through-hole formed through the housing 140 in the optical-axis direction.

The housing 140 may include a plurality of side portions and a plurality of corners.

Each of the corners of the housing 140 may be disposed or located between two adjacent side portions, and may interconnect the side portions.

Each of the side portions of the housing 140 may be disposed parallel to a corresponding one of side plates of the cover member 300.

In order to prevent the housing 140 from directly colliding with the inner surface of an upper plate of the cover member 300, the housing 140 may be provided at the upper portion, the upper end, or the upper surface thereof with a first stopper. In addition, in order to prevent the lower surface of the housing 140 from colliding with the base 210 and/or the circuit board 250, the housing 140 may be provided at the lower portion, the lower end, or the lower surface thereof with a second stopper.

The housing 140 may be provided at the upper portion, the upper end, or the upper surface thereof with at least one first coupling portion, which is coupled to a first outer frame of the upper elastic member 150, and may be provided at the lower portion, the lower end, or the lower surface thereof with a second coupling portion, which is coupled and secured to a second outer frame of the lower elastic member 160.

For example, each of the first coupling portion and the second coupling portion of the housing 140 may have the shape of a protrusion, a recess, or a plane.

The magnet 130 may be disposed at the housing 140.

In an example, the magnet 130 may be disposed on at least one of the side portions of the housing 140. Alternatively, in another embodiment, the magnet 130 may be disposed on at least one of the corners of the housing 140. The housing 140 may be provided with a seating portion to allow the magnet 130 to be seated therein, and the seating portion may have the shape of an opening, a hole, or a recess.

For example, the magnet 130 may be a monopolar magnetized magnet or a bipolar magnetized magnet.

The lens-moving unit 100 according to the embodiment may further include a sensing magnet and an AF position sensor in order to implement a feedback AF operation.

In an example, the sensing magnet may be disposed at the bobbin 110, and the AF position sensor may be disposed at the housing 140. In addition, the lens-moving unit 100 may be disposed at the housing 140, and may further include a circuit board on which the AF position sensor is disposed or mounted. In this case, the circuit board may include terminals that are electrically connected to the AF position sensor.

The sensing magnet may be moved together with the bobbin 110 in the optical-axis direction, and the AF position sensor may output a sensing signal (e.g. a sensing voltage) in response to the result of sensing the intensity of the magnetic field of the sensing magnet, which changes according to the movement of the bobbin 110.

In another embodiment, the sensing magnet may be disposed at the housing 140, and the AF position sensor may be disposed at the bobbin 110.

The AF position sensor may be implemented as a Hall sensor alone, or may be implemented in the form of a driver integrated circuit (IC) that includes a Hall sensor and a driver.

The upper elastic member 150 may be coupled to the upper portion, the upper end, or the upper surface of the bobbin 110, and the lower elastic member 160 may be coupled to the lower portion, the lower end, or the lower surface of the bobbin 110.

In an example, the upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The support member 220 may support the housing 140 to be movable relative to the base 210 and/or the circuit board 250 in a direction perpendicular to the optical axis, and may electrically connect at least one of the upper or lower elastic member 150 or 160 to the circuit board 250.

The upper elastic member 150 may include a plurality of upper elastic units that are electrically separated from each other. The plurality of upper elastic units may be electrically connected to the terminals of the circuit board on which the AF position sensor is disposed.

The upper elastic member or at least one of the plurality of upper elastic units may include a first outer frame coupled to the housing 140. For example, the upper elastic member may include a first inner frame coupled to the bobbin 110, a first outer frame coupled to the housing 140, and a first frame connection portion interconnecting the first inner frame and the first outer frame.

The support member 220 may include a plurality of support members, and each of the plurality of support members may electrically connect a corresponding one of the plurality of upper elastic units to a corresponding one of the terminals of the circuit board 250.

The support members 220 may be disposed at the corners of the housing 140. In an example, each of the support members 220 may be disposed at a corresponding one of the corners 142-1 to 142-4 of the housing 140. In another embodiment, the support members may be disposed at the side portion of the housing 140.

In an example, using solder or a conductive adhesive member, one end of the support member 220 may be coupled to the first outer frame of the upper elastic member or the upper elastic unit, and the other end of the support member 220 may be coupled to the circuit board 250.

The support member 220 may be implemented as a member that is conductive and performs a support function using the elasticity thereof, for example, a suspension wire, a leaf spring, or a coil spring. Alternatively, in another embodiment, the support member 220 may be integrally formed with the upper elastic member 150.

The lower elastic member 160 may include a plurality of lower elastic units.

The lower elastic member 160 or at least one of the lower elastic units may include a second inner frame, which is coupled or secured to the lower portion, the lower surface, or the lower end of the bobbin 110, a second outer frame, which is coupled or secured to the lower portion, the lower surface, or the lower end of the housing 140, and a second frame connection portion, which interconnects the second inner frame and the second outer frame.

The upper elastic member 150 (or the upper elastic unit) and the lower elastic member 160 (or the lower elastic unit) may be implemented as a leaf spring, without being limited thereto, and may alternatively be implemented as a coil spring or the like. The term "elastic unit" may be interchanged with "spring", the term "outer frame" may be interchanged with "outer portion", the term "inner frame" may be interchanged with "inner portion", and the support member 220 may be referred to as a "wire".

In an example, the first coil 120 may be directly connected or coupled to the second inner frames of any two of the lower elastic units. Alternatively, the first coil 120 may be directly connected or coupled to the first inner frames of any two of the upper elastic units.

The AF position sensor may be electrically connected to the circuit board 250 via the upper elastic units and the support members. When the AF position sensor is mounted on the circuit board disposed in the housing 140, the upper elastic units may be electrically connected to the circuit board on which the AF position sensor is mounted.

The first coil 120 may be electrically connected to the circuit board 250 via two lower elastic units (or two upper elastic units) and the support members.

The base 210 may have therein an opening corresponding to the opening in the bobbin 110 and/or the opening in the housing 140, and may have a shape that coincides with or corresponds to that of the cover member 300, for example, a quadrangular shape. For example, the opening in the base 210 may be a through-hole formed through the base 210 in the optical-axis direction.

The base 210 may be provided at the upper surface thereof with a seating recess in which the OIS position sensor is disposed. The base 210 may be provided at the lower surface thereof with a seating portion in which the filter 610 of the camera module 200 is mounted.

The second coil may be disposed on the circuit board 250, and the OIS position sensor may be disposed in the seating recess in the base 210, which is located below the circuit board 250. The first coil may be referred to as an "AF coil", and the second coil may be referred to as an "OIS coil".

Figures 6C, 7:
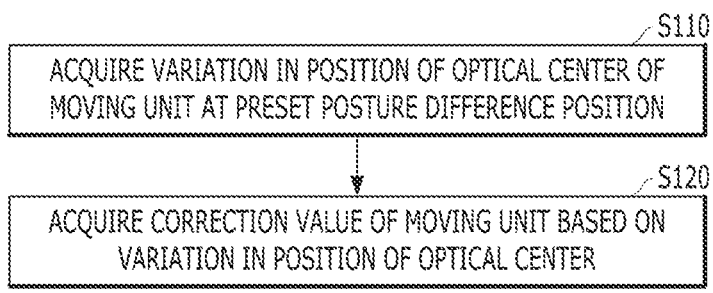
FIG. 6C illustrates still another example of correction value information stored in the correction value generator.
FIG. 7 is a flowchart illustrating a method of generating a correction value stored in the correction value generator.

The OIS position sensor may include a first sensor 240a and a second sensor 240b (refer to FIG. 7).

The first and second sensors 240a and 240b may sense the displacement of an OIS operation unit in a direction perpendicular to the optical axis. Here, the OIS operation unit (or the OIS unit) may include the AF operation unit and components mounted to the housing 140 (e.g. the magnet 130 and the AF position sensor).

For example, the AF operation unit may include the bobbin 110 and components mounted to the bobbin 110 so as to move together with the bobbin 110. For example, the AF operation unit may include the bobbin 110, a lens (not shown) mounted to the bobbin 110, the first coil 120, and the sensing magnet.

The circuit board 250 may be disposed on the upper surface of the base 210, and may have therein an opening corresponding to the opening in the bobbin 110, the opening in the housing 140, and/or the opening in the base 210. The opening in the circuit board 250 may be a through-hole.

The circuit board 250 may have a shape that coincides with or corresponds to that of the upper surface of the base 210, for example, a quadrangular shape.

The circuit board 250 may include a plurality of terminals for receiving electrical signals from the outside.

The second coil may be disposed under the bobbin 110. For example, the second coil may include coil units 230-1 and 230-2, which correspond to or face the magnet 130 disposed at the housing 140 in the optical-axis direction.

The coil units 230-1 and 230-2 of the second coil may be disposed above the circuit board 250 or on the upper surface of the circuit board 250.

For example, the second coil may include a circuit member 231 and a plurality of coil units 230-1 and 230-1 formed at the circuit member 231. Here, the circuit member 231 may be referred to as a "board", a "circuit board", or a "coil board".

For example, the second coil may include two coil units 230-1 and 230-2, which face each other in a first horizontal direction (or a first diagonal direction), and two coil units, which face each other in a second horizontal direction (or a second diagonal direction), without being limited thereto.

In an example, the two coil units 230-1 and 230-2 facing each other in the first horizontal direction (or the first diagonal direction) may be connected in series to each other, and the two coil units facing each other in the second horizontal direction (or the second diagonal direction) may be connected in series to each other, without being limited thereto. For example, the first horizontal direction (or the first diagonal direction) and the second horizontal direction (or the second diagonal direction) may be directions perpendicular to each other.

For example, the two coil units 230-1 and 230-2 facing each other in the first horizontal direction (or the first diagonal direction) may move the OIS operation unit in the X-axis direction by interacting with the magnet 130, and may be referred to as "X-axis-directional OIS coils".

In addition, the two coil units facing each other in the second horizontal direction (or the second diagonal direction) may move the OIS operation unit in the Y-axis direction by interacting with the magnet 130, and may be referred to as "Y-axis-directional OIS coils".

For example, the first horizontal direction may be a direction in which the two opposite side portions of the housing 140 face each other, and the second horizontal direction may be a direction in which the other two opposite side portions of the housing 140 face each other. Also, for example, the first diagonal direction may be a direction in which two opposite corners of the housing 140 face each other, and the second diagonal direction may be a direction in which the other two opposite corners of the housing 140 face each other.

In another embodiment, the second coil may include one coil unit located in the first horizontal direction (or the first diagonal direction) and one coil unit located in the second horizontal direction (or the second diagonal direction). In still another embodiment, the second coil may include four or more coil units.

Power or a driving signal may be provided to the second coil from the circuit board 250. In an example, a first driving signal may be provided to any two coil units 230-1 and 230-2 connected in series, and a second driving signal may be provided to the other two coil units connected in series.

The first driving signal and the second driving signal may be a direct-current signal or an alternating-current signal, or may include a direct-current signal and an alternating-current signal, and may have the form of current or voltage.

Due to the interaction between the magnet 130 and the coil units, the OIS operation unit, for example, the housing 140, may move in the second direction and/or the third direction, for example, the x-axis direction and/or the y-axis direction, thereby performing hand-tremor compensation.

The coil units of the second coil may be electrically connected to corresponding ones of the terminals of the circuit board 250 in order to receive a driving signal from the circuit board 250.

The coil units of the second coil are implemented in the form of a circuit pattern, such as an FP coil, formed at the circuit member 231, rather than the circuit board 250, without being limited thereto. In another embodiment, the coil units of the second coil may be implemented in the form of a ring-shaped coil block, with the circuit member 231 omitted, or may be implemented in the form of a circuit pattern, such as an FP coil, formed at the circuit board 250.

In an example, the first sensor 240a may overlap one of the two magnets, facing each other in the first horizontal direction, in the optical-axis direction, and the second sensor 240b may overlap one of the two magnets, facing each other in the second horizontal direction, in the optical-axis direction.

Each of the first and second sensors 240a and 240b may be a Hall sensor. Any sensor may be used, so long as the same is capable of sensing the intensity of a magnetic field. For example, each of the first and second sensors 240a and 240b may be implemented as a position detection sensor, such as a Hall sensor, alone, or may be implemented in the form of a driver including a Hall sensor.

The circuit board 250 may be provided with a terminal surface at which the terminals are provided.

According to the embodiment, the circuit board 250 may be a flexible printed circuit board (FPCB), without being limited thereto. The terminals of the circuit board 250 may be directly formed on the surface of the base 210 using a surface electrode method or the like.

The circuit board 250 may have therein a hole through which the support member 220 extends. The support member 220 may extend through the hole in the circuit board 250, and may be electrically connected to the pad (or the circuit pattern) formed on the lower surface of the circuit board 250 using solder or a conductive adhesive member, without being limited thereto.

In another embodiment, the circuit board 250 may have no holes therein, and the support members 220 may be electrically connected to the circuit pattern or the pad formed on the upper surface of the circuit board 250 using solder or a conductive adhesive member.

Alternatively, in another embodiment, the support members 220-1 to 220-4 may connect the upper elastic units 150-1 to 150-4 to the circuit member 231, and the circuit member 231 may be electrically connected to the circuit board 250.

The cover member 300 accommodates the bobbin 110, the first coil 120, the magnet 130, the housing 140, the upper elastic member 150, the lower elastic member 160, the support member 220, the second coil, the OIS position sensor, and the circuit board 250 in an accommodation space formed together with the base 210.

The cover member 300 may be formed in the shape of a box, the lower portion of which is open and which includes an upper plate and side plates. The lower portion of the cover member 300 may be coupled to the upper portion of the base 210.

The lens-moving unit 100 and the lens module 400 may include a moving unit, a fixing unit, and an elastic member connecting the moving unit to the fixing unit.

In an example, the moving unit may include the OIS operation unit and the lens module 400.

The OIS operation unit may include the bobbin 110, the first coil 120, the housing 140, and the magnet 130. In addition, the OIS operation unit may include the AF position sensor.

The fixing unit may include at least one of the base 210, the circuit board 250, and the second coil.

The elastic member may include at least one of the upper elastic member 150, the lower elastic member 160, and the support member 220.

The OIS position sensors 240*a* and 240*b* may be disposed at the fixing unit, and may output an output signal in response to the result of sensing the movement of the moving unit in a direction perpendicular to the optical axis, and the controller may acquire information about the position of the moving unit based on the output signals from the OIS position sensors 240*a* and 240*b*. Hereinafter, the term "acquire" may include the meaning of any one of "receive", "calculate", "compute", "extract", or "detect".

Figure 3:
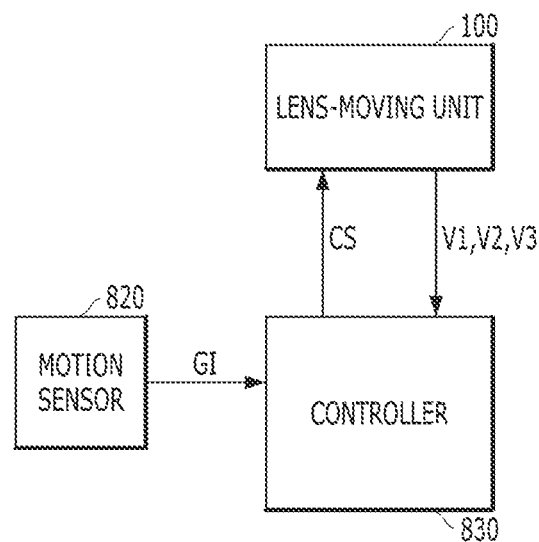
FIG. 3 is a block diagram of a lens-moving unit, a motion sensor, and a controller of the camera module shown in FIG. 1.

FIG. 3 is a block diagram of the lens-moving unit 100, the motion sensor 820, and the controller 830 of the camera module 200 shown in FIG. 1.

Referring to FIG. 3, the motion sensor 820 provides position information GI on the camera module 200 according to the motion of the camera module 200 to the controller 830.

The position information GI on the camera module 200 may include at least one of angular speed information and acceleration information according to the motion of the camera module 200.

For example, the angular speed information of the motion sensor 820 may include at least one of an X-axis angular speed, a Y-axis angular speed, and a Z-axis angular speed. Also, for example, the acceleration information of the motion sensor 820 may include at least one of X-axis acceleration, Y-axis acceleration, and Z-axis acceleration.

The controller 830 may generate a control signal CS for controlling the lens-moving unit 100, and may provide the same to the lens-moving unit 100.

For example, the control signal CS may include an AF driving signal, which is provided to the first coil 120 of the lens-moving unit 100, an OIS driving signal, which is provided to the second coils 230-1 and 230-2, and an OIS sensor control signal for driving or controlling the OIS position sensors 240*a* and 240*b*.

In addition, the control signal CS may further include an AF sensor control signal for driving or controlling the AF position sensor.

The controller 830 may receive a first output signal V1 output from the first sensor 240*a* of the lens-moving unit 100 and a second output signal V2 output from the second sensor 240*b*.

In addition, the controller 830 may receive a third output signal V3 output from the AF position sensor of the lens-moving unit 100.

In another embodiment, the motion sensor may be omitted from the camera module, and may be included in an optical device (e.g. a terminal 200A), which will be described later, and the controller 830 may receive information about the rotational angular speed of the optical device from the motion sensor included in the optical device (e.g. the terminal 200A).

In still another embodiment, a controller 78 included in the optical device (e.g. the terminal 200A) may perform the operation of the controller 830, which will be described later.

The controller 830 may include a hand-tremor controller for performing hand-tremor compensation on the lens-moving unit 100.

When the moving unit is tilted by gravity, the hand-tremor controller may acquire a correction value for compensating for the extent of tilting of the moving unit, and may control the movement of the moving unit using the acquired correction value (or based on the correction value). At this time, the "extent of tilting" of the moving unit may be referred to as the "extent of sagging" or a "tilt angle".

In an example, the hand-tremor controller may acquire a correction value for compensating for the extent of tilting (or the extent of sagging) of the "moving unit" with respect to the direction of gravity or the optical axis using posture information on the moving unit (or a posture difference thereof), and may control movement of the "moving unit" in a direction perpendicular to the optical axis based on the acquired correction value, thereby improving the accuracy of hand-tremor compensation.

Figure 4:
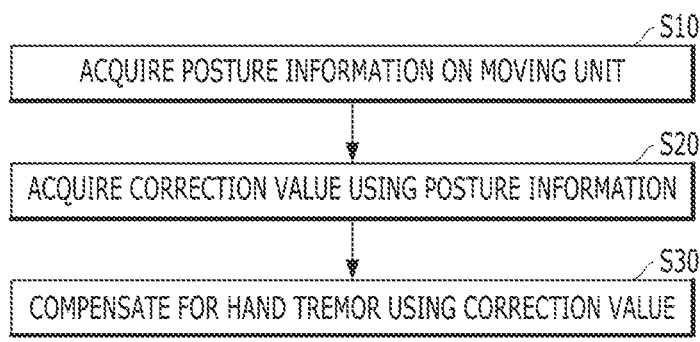
FIG. 4 is a flowchart of a hand-tremor control method of a hand-tremor controller according to an embodiment.

FIG. 4 is a flowchart of a hand-tremor control method of the hand-tremor controller according to an embodiment.

Referring to FIG. 4, posture information on the moving unit is first acquired (S10).

For example, the hand-tremor controller may receive sensing information output from the motion sensor 820 and may acquire posture information on the moving unit using the received sensing information GI. In this case, the motion sensor may be mounted to the camera module 200 or the optical device, for example, the terminal 200A.

For example, the sensing information of the motion sensor 820 may be position information GI, posture information, or motion information on the camera module 200 (the optical device).

For example, the hand-tremor controller may acquire position information, posture information, or motion information on the camera module (or the optical device) using the sensing information of the motion sensor 820, and may acquire posture information on the moving unit using the acquired position information, posture information, or motion information on the camera module (or the optical device).

The posture information on the moving unit (or the camera module or the optical device) may include a tilt angle of a reference axis at the current position of the moving unit (or the camera module or the optical device) based on the reference axis at a reference position. For example, the reference position may be a position at which the reference axis perpendicular to the sensor surface of the image sensor 810 is parallel to the direction of gravity. For example, the sensor surface may be the active area of the image sensor 810.

Subsequently, a correction value is acquired using the posture information on the moving unit (S20).

For example, the hand-tremor controller may include a memory in which correction value information on the moving unit according to the posture information on the moving unit is stored. For example, the correction value information may include at least one of the extent of tilting of the moving unit and variation in the position of the optical center of the moving unit. In addition, the hand-tremor controller may acquire a correction value using the posture information.

For example, the hand-tremor controller may acquire posture information on the moving unit using the Z-axis acceleration of the camera module, and may acquire tilt information on the moving unit using the posture information on the moving unit.

Subsequently, hand-tremor compensation is performed using the correction value.

The hand-tremor controller may compensate for the extent of tilting of the moving unit using the correction value.

For example, the hand-tremor controller may control the movement of the moving unit in a direction perpendicular to the optical axis in order to perform hand-tremor compensation.

For example, the hand-tremor controller may compensate for hand tremor based on the correction value during the hand-tremor compensation.

Alternatively, for example, the hand-tremor controller may perform hand-tremor compensation on the moving unit after compensating for the extent of tilting of the moving unit based on the correction value.

Figure 5:
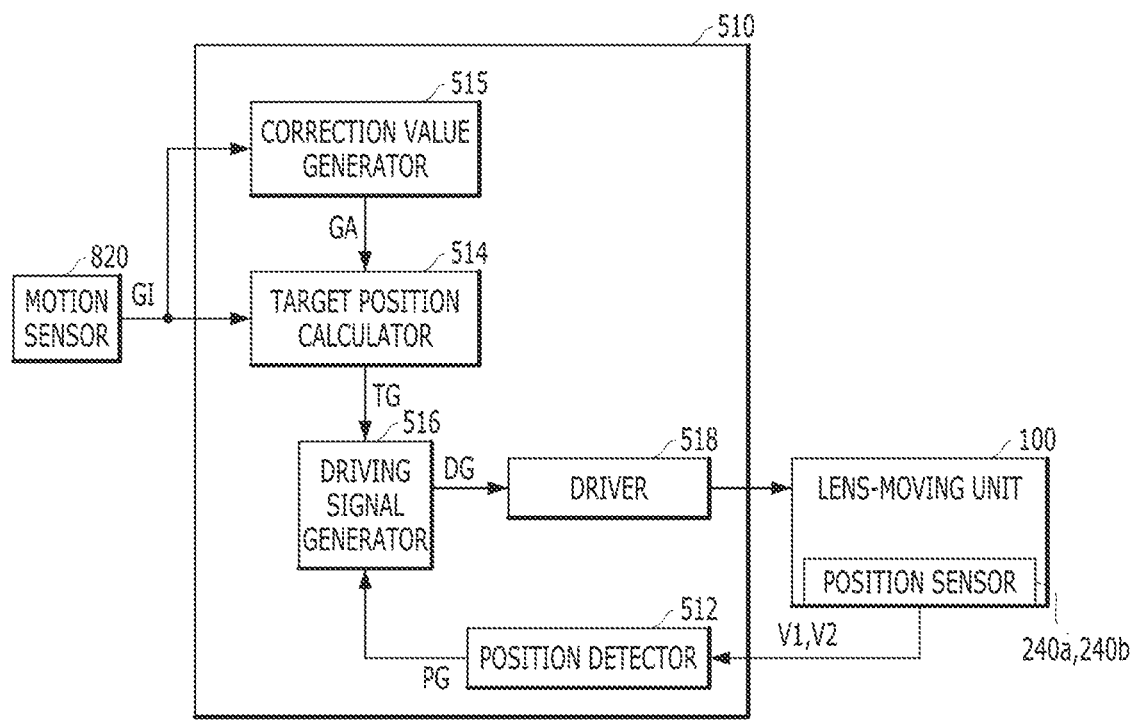
FIG. 5 is a configuration diagram illustrating an embodiment of the hand-tremor controller.

FIG. 5 is a configuration diagram illustrating an embodiment of the hand-tremor controller 510.

Referring to FIG. 5, the hand-tremor controller 510 may include a position detector 512, a target position calculator 514, a correction value generator 515, a driving signal generator 516, and a driver 518.

The position detector 512 may receive the output signals V1 and V2 output from the OIS position sensors 240a and 240b of the moving unit, for example, the lens-moving unit 100, and may generate position information (or position data) on the moving unit based on the received output signals V1 and V2.

For example, the position information on the moving unit may be information or data on the current position of the lens of the moving unit or the lens-moving unit 100. For example, the position information on the moving unit may include information about two-dimensional (x,y) coordinates based on the X-axis and the Y-axis.

For example, the position detector 512 may generate position information on the moving unit in the X-axis direction and position information on the moving unit in the Y-axis direction based on the first output signal V1 and the second output signal V2.

For example, the position detector 512 may include an amplifier and an analog-to-digital converter.

For example, the first output signal V1 and the second output signal V2 may be amplified by the amplifier of the position detector 512, and the analog-to-digital converter of the position detector 512 may convert the amplified first output signal V1 and the second output signal V2 into digital data or digital code to generate position information PG on the moving unit.

The target position calculator 514 may calculate target position information (or target position data) for hand-tremor compensation using the position information GI on the camera module 200 (or the optical device), which is provided from the motion sensor 820.

The "target position information" may be referred to as "target information", a "target tilt angle", or a "target angle".

For example, the target position calculator 514 may calculate the target position information TG for hand-tremor compensation using at least one of the angular speed information and the acceleration information provided from the motion sensor 820.

The target position calculator 514 may calculate the target position information TG based on the position information GI on the camera module 200 and the correction value GA provided from the correction value generator 515.

For example, the target position calculator 514 may integrate at least one of the angular speed information and the acceleration information on the camera module 200, provided from the motion sensor 820, and may calculate an angle (or tilt) and a moving distance (shift) based on the result of integration thereof.

Also, for example, the target position calculator 514 may calculate target position information TG (or target position data) on the camera module 200 based on the calculated angle and/or the moving distance and the correction value provided from the correction value generator 515.

The correction value generator 515 may store correction value information corresponding to the posture information on the moving unit.

For example, the correction value generator 515 may include a memory that stores a look-up table for storing correction value information corresponding to the posture information on the moving unit.

In another embodiment, a memory for storing correction value information may be provided separately from the hand-tremor controller, and may be provided in the camera module 200 or the optical device (e.g. the terminal 200A).

For example, the correction value information may include at least one of the extent of tilting (or the correction value) of the moving unit, variation in the position of the optical center of the moving unit, and default variation.

FIG. 6A illustrates an example of the correction value information stored in the correction value generator 515.

Referring to FIG. 6A, the correction value generator 515 may include a look-up table for storing correction value information corresponding to preset posture information on the moving unit.

For example, the preset posture information on the moving unit may be 90 degrees, 15 degrees, 30 degrees, 45 degrees, or 60 degrees, without being limited thereto. For example, the preset posture information may be further subdivided than what is illustrated in FIG. 6A.

The look-up table may store correction values corresponding to preset respective pieces of posture information (e.g. θz=15 degrees, 30 degrees, 45 degrees, 60 degrees, and 90 degrees).

The correction values may include X-axis tilt angles A1 to A5 and Y-axis tilt angles B1 to B5 corresponding to preset pieces of posture information (e.g. θz=15 degrees, 30 degrees, 45 degrees, 60 degrees, and 90 degrees).

The correction value generator 515 may acquire current position information on the moving unit using the sensing information of the motion sensor 820, e.g. the position information GI, or based on the sensing information.

The correction value generator 515 may acquire posture information on the moving unit using the sensing information provided from the motion sensor 820 or the position information GI.

The correction value generator 515 may detect the presence or absence of a posture difference of the moving unit, may determine the extent of the posture difference of the moving unit, and may acquire posture difference information or posture information on the moving unit using the position information GI on the camera module 200 (or the optical device) provided from the motion sensor 820.

For example, the correction value generator 515 may acquire current posture information on the moving unit using the Z-axis acceleration provided from the motion sensor 820.

For example, the correction value generator 515 may acquire or calculate the current posture information on the moving unit using the result of integration of the Z-axis acceleration of the camera module 200.

The correction value generator 515 may acquire a correction value corresponding to the current posture information on the moving unit, which is calculated by the correction value generator 515 using the correction value information stored in the look-up table.

For example, referring to FIG. 6A, when the current posture information on the moving unit acquired by the correction value generator 515 is 90 degrees, the correction value generator 515 may acquire or generate correction values A1 and B1 for compensating for sagging of the moving unit due to gravity.

When acquiring the target position information TG for the hand-tremor compensation of the camera module 200, the hand-tremor controller 510 may acquire posture information on the moving unit using the Z-axis acceleration of the camera module 200 provided from the motion sensor 820, and may generate or acquire a correction value GA for compensating for sagging of the moving unit due to gravity at a position corresponding to the acquired posture information.

The hand-tremor controller 510 may correct an error of the target position information TG attributable to gravity using the acquired correction value GA, thereby improving the accuracy of hand-tremor compensation.

The driving signal generator 516 may generate a driving control signal based on or using the target position information TG and the position information PG on the moving unit (e.g. the lens-moving unit 100).

For example, the driving signal generator 516 may acquire error information (or error data) about hand-tremor compensation based on or using the target position information TG and the position information PG on the moving unit (e.g. the lens-moving unit 100).

For example, the error information may be a difference TG-PG between the target position information TG and the position information PG on the moving unit.

For example, the driving signal generator 516 may generate a driving control signal DG for controlling the driver 518 based on or using the error information.

For example, the driving signal generator 516 may include a comparator, which compares the target position information TG with the position information PG on the lens-moving unit 100, and a proportional integral derivative (PID) controller, which performs PID control on the output from the comparator.

The driver 518 may control the movement of the moving unit in a direction perpendicular to the optical axis, for example, in the X-axis direction and/or the Y-axis direction, based on the driving control signal DG.

For example, the driver 518 may generate a first signal for driving the X-axis-directional OIS coils of the lens-moving unit 100 and a second signal for driving the Y-axis-directional OIS coils based on the driving control signal DG.

For example, the driver 518 may include an amplifier for amplifying the output of the PID controller of the driving signal generator 516, a pulse signal generator for generating a pulse signal (e.g. a PWM signal) based on the output of the amplifier, and a driver for generating the driving control signal DG based on the pulse signal, without being limited thereto.

FIG. 6B illustrates another example of the correction value information stored in the correction value generator 515.

Referring to FIG. 6B, the correction value generator 515 may include a look-up table for storing variation in the optical center OC of the moving unit corresponding to the preset posture information on the moving unit. The variation in the optical center of the moving unit may include variation in the optical center in the X-axis direction and variation in the optical center in the Y-axis direction, which will be described later.

Variations dx to dx4 and dy to dy4 in the optical center of the moving unit corresponding to the preset pieces of posture information on the moving unit (e.g. θz=15 degrees, 30 degrees, 45 degrees, 60 degrees, and 90 degrees) may be stored in the look-up table shown in FIG. 6B.

The correction value generator 515 may store a function, an algorithm, or a program for acquiring a correction value corresponding to the current posture information on the moving unit using the correction value information stored in the look-up table shown in FIG. 6B.

That is, the correction value generator 515 may acquire a correction value corresponding to the current posture information on the moving unit using the variations dx to dx4 and dy to dy4 in the optical center of the moving unit stored in the look-up table shown in FIG. 6B.

FIG. 6C illustrates still another example of the correction value information stored in the correction value generator 515.

Referring to FIG. 6C, the correction value generator 515 may include a look-up table for storing variation in the optical center OC of the moving unit corresponding to the preset posture information on the moving unit and default variation. The default variation may include default variation in the X-axis direction and default variation in the Y-axis direction, which will be described later.

The correction value generator 515 may store a function, an algorithm, or a program for acquiring a correction value corresponding to the current posture information on the moving unit using the correction value information stored in the look-up table shown in FIG. 6C.

That is, the correction value generator 515 may acquire a correction value corresponding to the current posture information on the moving unit using the variations dx to dx4 and dy to dy4 in the optical center of the moving unit and the default variations dPx to dPx4 and dPy to dPy4 stored in the look-up table shown in FIG. 6B.

FIG. 7 is a flowchart illustrating a method of generating the correction value stored in the correction value generator 515.

Referring to FIG. 7, variation in the optical center OC of the moving unit having a preset posture difference is first acquired (S110).

The posture difference of the moving unit may occur due to gravity, and the position of the optical center of the moving unit 100 may change due to the posture difference of the moving unit.

For example, the optical center of the moving unit 100 may be the optical center of the lens of the moving unit 100.

The presence or absence of the posture difference of the moving unit and the extent of the posture difference of the moving unit may be determined based on the result of determining the posture information on the moving unit.

Figure 8:
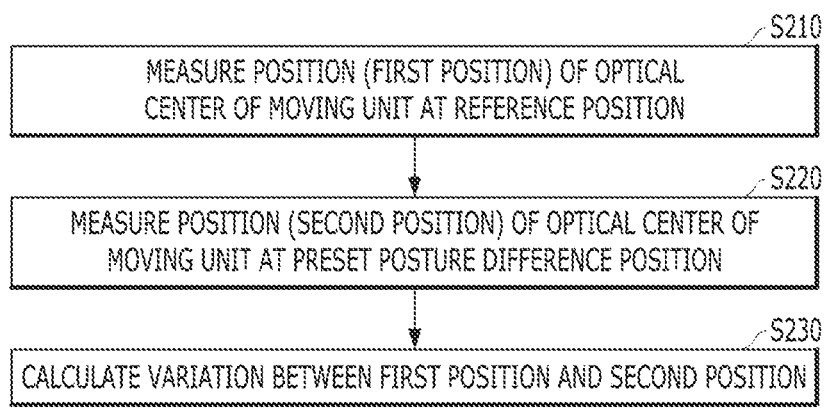
FIG. 8 illustrates a method of acquiring variation in an optical center of a moving unit shown in FIG. 7.
Figure 9:
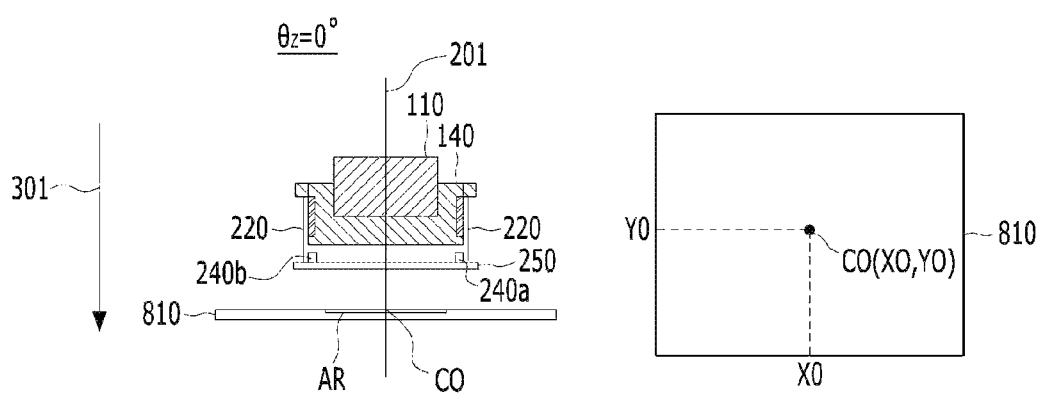
FIG. 9 illustrates a posture difference of the moving unit and a coordinate value of the position CO of the optical center of the moving unit at a reference position.
Figure 10:
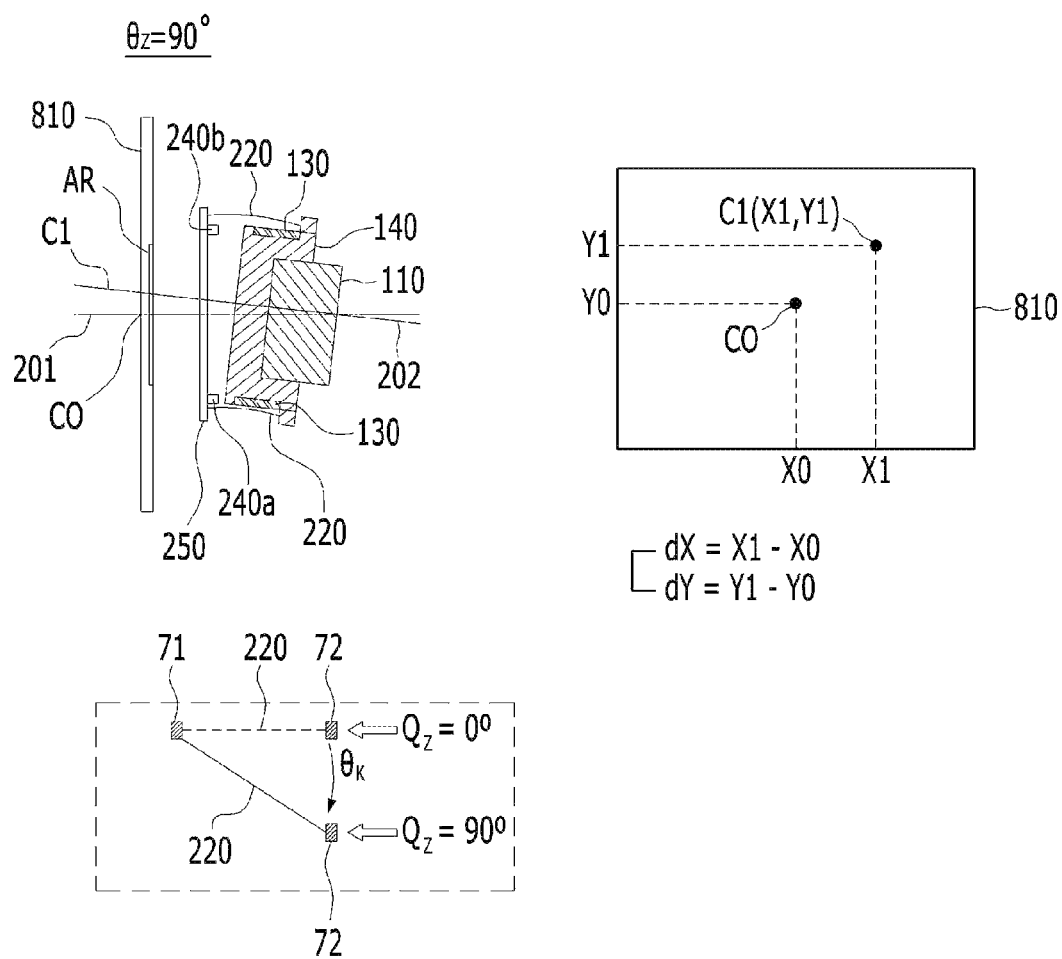
FIG. 10 illustrates a posture difference of the moving unit and a coordinate value of the position of the optical center of the moving unit calculated based on preset posture information on the moving unit.

FIG. 8 illustrates a method of acquiring variation in the optical center of the moving unit shown in FIG. 7, FIG. 9 illustrates the posture difference of the moving unit and the coordinate value of the position CO of the optical center of the moving unit at the reference position, and FIG. 10 illustrates the posture difference of the moving unit and the coordinate value of the position Cl of the optical center of the moving unit, calculated based on the preset posture information on the moving unit.

In order to acquire variation in the optical center OC, the position of the optical center of the moving unit at the reference position is measured (S210).

For example, the "reference position" may be the position of the moving unit when there is no posture difference (hereinafter referred to as a "first position").

Because tilting or sagging of the moving unit corresponding to the posture difference of the moving unit may occur due to gravity, the reference position may be set based on, for example, the direction of gravity 301.

For example, the reference position may be the position of the moving unit when a reference axis 201 is parallel to the direction of gravity 301. For example, the reference axis 201 may be a linear axis perpendicular to the sensor surface (e.g. the active area AR or the effective area) of the image sensor 810.

Alternatively, for example, the reference position may be the position of the moving unit when the reference axis 201 is parallel to the optical axis of the moving unit.

For example, when the axis parallel to the direction of gravity 301 is the Z-axis, the tilt angle θz of the reference axis 201 with respect to the Z-axis at the reference position may be 0 degrees or 180 degrees.

When the tilt angle θz is 0 degrees, the camera module is in a state in which the lens or the bobbin is oriented in an upward direction, as shown in FIG. 8. On the other hand, when the tilt angle θz is 180 degrees, the camera module shown in FIG. 8 rotates 180 degrees such that the lens or the bobbin is oriented in a downward direction.

For example, the moving unit may be supported by the fixing unit due to the elastic members 150 and 160 and the support member 220.

When the moving unit is located at the reference position, the moving unit, for example, the OIS operation unit, may be affected only by gravity in the Z-axis direction and may not be affected in the X-axis direction or the Y-axis direction. For example, when the moving unit is located at the reference position, the optical center of the moving unit may not be affected by gravity, and thus the correction value may be 0.

The position of the optical center of the moving unit may be expressed as a specific coordinate value in the active area AR or the effective area of the image sensor 810.

The coordinate value in the active area AR of the image sensor 810 corresponding to the position of the optical center of the moving unit at the reference position may be stored in the hand-tremor controller 510.

For example, the position of the optical center of the moving unit may be defined as the coordinate value of the brightest pixel of the image sensor 810 when the light that has passed through the lens of the moving unit is sensed by the image sensor 810.

For example, the brightest pixel may be the pixel having the highest pixel value, among the pixels in the effective area of the image sensor sensing the light that has passed through the lens. Here, the pixel value may be a voltage value stored in the pixel of the image sensor.

For example, the posture difference of the moving unit may be expressed as "posture information" on the moving unit.

The posture information on the moving unit may be the tilt angle θz of the reference axis 201 at a preset posture difference position of the moving unit with respect to the reference axis 201 at the reference position. For example, the preset posture difference position may be the position of the moving unit having a preset posture difference.

For example, the posture information on the moving unit may be the difference between the posture of the moving unit at the reference position and the posture of the moving unit at the position of the moving unit having a preset posture difference.

For example, the position CO of the optical center of the moving unit at the reference position may have a first coordinate value (X0,Y0).

Subsequently, the position of the optical center of the moving unit at the position of the moving unit having a preset posture difference is measured (S220).

Referring to FIG. 10, when the preset posture difference is 90 degrees (θz=90 degrees), the elastic members 150 and 160 and the support member 220 of the moving unit are affected by gravity. As shown in FIG. 9, the elastic members 150 and 160 and the support member 220 may be deformed by gravity, and the moving unit may be tilted.

For example, when the preset posture difference is 90 degrees (θz=90), the support member 220 may be bent by gravity such that one end of the support member 220 coupled to the moving unit sags downwards. Accordingly, the moving unit may be tilted or may sag, and the position of the optical center of the moving unit may change or may move.

For example, one end 72 of the support member 220 may be a portion that is coupled to the upper elastic member 150, and the other end 71 of the support member 220 may be coupled to the circuit board 250 or the base 210.

For example, the extent of bending of the support member 220 at a preset posture difference position (e.g. θz=90 degrees) with respect to the support member 220 at the reference position (θz=0 degrees), at which there is no posture difference, may be referred to as the "extent of tilting" or "the extent of sagging" of the moving unit. At this time, the extent of tilting or the extent of sagging of the moving unit may be determined according to the posture difference θz of the moving unit, and the correction value may be generated based on the extent of sagging of the moving unit.

As shown in FIG. 9, when the preset posture difference of the moving unit is 90 degrees (θz=90 degrees), the position C1 of the optical center of the moving unit may have a second coordinate value (X1,Y1).

The position of the optical center of the moving unit at the reference position may be referred to as a "first position", and the position of the optical center of the moving unit at the preset posture difference position may be referred to as a "second position".

Subsequently, variation in the position of the optical center of the moving unit between the first position and the second position is calculated (S230).

For example, the variation in the position of the optical center of the moving unit may be a difference between the second coordinate value (X1,Y1) at the second position and the first coordinate value (X0,Y0) at the first position.

For example, the variation dX in the position in the X-axis direction may be a difference X1-X0 between the X-axis coordinate value X1 at the second position and the X-axis coordinate value X0 at the first position. In addition, the variation dY in the position in the Y-axis direction may be a difference Y1-Y0 between the Y-axis coordinate value Y1 at the second position and the Y-axis coordinate value Y0 at the first position.

Subsequently, a correction value of the moving unit is acquired using the variation in the position of the optical center of the lens-moving unit 100 (S120).

For example, the correction value may be generated or calculated based on the first coordinate value and the second coordinate value.

For example, in another embodiment, the correction value may be generated or calculated based on the variation dX in the position in the X-axis direction and the variation dY in the position in the Y-axis direction.

For example, in still another embodiment, the correction value may be generated or calculated based on the extent of tilting or the extent of sagging of the moving unit corresponding to the variation in the position of the optical center of the moving unit.

Figure 11:
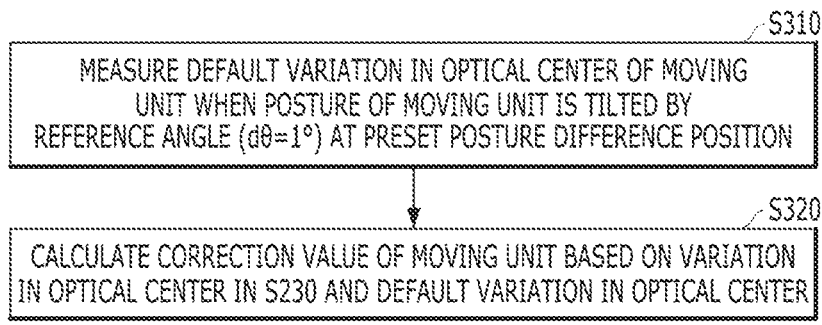
FIG. 11 illustrates an embodiment of a method of acquiring the correction value of the moving unit.

FIG. 11 illustrates an embodiment of a method of acquiring the correction value of the moving unit, and FIG. is a diagram for explaining the measurement of the default variation in the position of the optical center of the moving unit according to FIG. 11.

Figure 12:
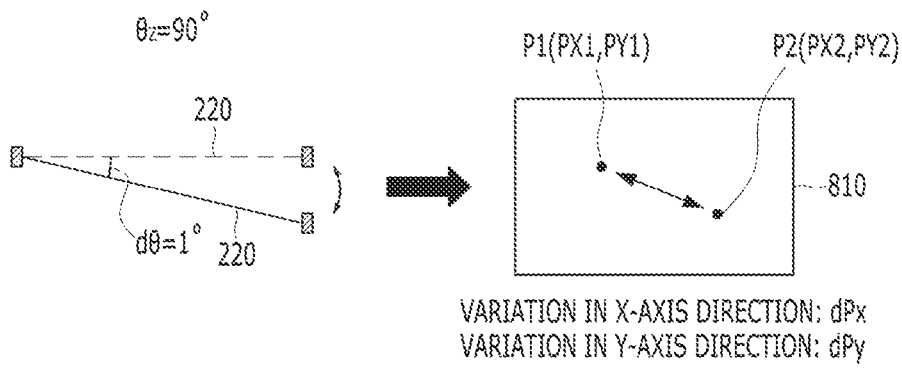
FIG. 12 is a diagram for explaining measurement of default variation in the position of the optical center of the moving unit according to FIG. 11.

Referring to FIGS. 11 and 12, when the posture of the moving unit is tilted by a reference angle in the direction of gravity at the preset posture difference position (preset posture information), variation in the position of the optical center of the moving unit (hereinafter referred to as "default variation") is first measured (S310).

For example, when the support member 220 of the lens-moving unit 100 is tilted by a reference angle in the direction of gravity from the preset posture difference position (preset posture information), the default variation in the position of the optical center of the moving unit may be measured.

For example, the preset posture difference may be 90 degrees ($\theta z = 90$ degrees), without being limited thereto. In another embodiment, the preset posture difference may be set to be greater than 0 degrees and less than 180 degrees. For example, the preset posture difference may include the posture information $\theta z$ described with reference to FIGS. 6A to 6C.

For example, the reference angle may be 1 degree, without being limited thereto. The reference angle may be set in order to easily calculate the extent of tilting (or the extent of sagging) and the correction value of the moving unit, and may be set to be greater than 1 or less than 1.

Referring to FIG. 12, for example, in the case of $\theta z = 90$ degrees, when the support member 220 of the lens-moving unit 100 is located at a position A1, the coordinate value of the position of the optical center of the moving unit may be P1(PX1,PY1), and when the support member 200 of the lens-moving unit 100 is located at a position A2, the coordinate value of the position of the optical center of the moving unit may be P2(PX2,PY2).

For example, the tilt angle $d\theta$ between the support member 220 at the position A1 and the support member 220 at the position A2 may be a reference angle (e.g. 1 degree).

The default variation may be a difference between the coordinate value P2 and the coordinate value P1.

The default variation may include variation in the X-axis direction (dPx=PX2−PX1) and variation in the Y-axis direction (dPy=PY2−PY1).

Subsequently, a correction value of the moving unit is calculated based on the variation in the position of the optical center of the moving unit in step S230 and the default variation in step S310 (S320).

For example, based on the default variation in step S310, the variation in the position of the optical center of the moving unit at the preset posture difference position in step S230 may be converted into the extent of tilting or the extent of sagging $\theta k$ (refer to FIG. 8) of the moving unit. The extent of tilting (or the extent of sagging) may be expressed as a tilt angle (or a sagging angle), and the correction value may be expressed as a tilt angle (or a sagging angle $\theta k$), or may include a tilt angle (or a sagging angle $\theta k$).

For example, the tilt angle $\theta k$ of the moving unit may be an angle to which the support member 220 of the lens-moving unit 100 is bent or tilted at the preset posture difference position (e.g. $\theta z = 90$ degrees) with respect to the support member 220 of the lens-moving unit 100 at the reference position ($\theta z = 0$). For example, the sagging angle $\theta k$ may be a tilt angle with respect to one end 72 of the support member 220.

For example, the tilt angle $\theta k$ may be calculated based on a ratio of the variation in the position of the optical center of the moving unit at the preset posture difference position to the default variation.

The look-up table of the hand-tremor controller 510 may store the correction value (e.g. the tilt angle $\theta k$) acquired as described with reference to FIGS. 8 and 11 (refer to FIG. 6A).

Alternatively, the look-up table of the hand-tremor controller 510 may store the variation in the position of the optical center of the moving unit acquired as described with reference to FIG. 8 (refer to FIG. 6B).

Alternatively, the look-up table of the hand-tremor controller 510 may store the variation in the position of the optical center of the moving unit, acquired as described with reference to FIGS. 8 and 11, and the default variation in the optical center of the moving unit (refer to FIG. 6C).

The correction value generator 515 may generate a correction value corresponding to the posture information (or the posture difference) of the moving unit, acquired by the correction value generator 515, using the look-up tables (FIGS. 6A, 6B and 6C).

For example, the correction value generator 515 may select and extract one piece of correction value information corresponding to the posture information on the moving unit, acquired by the correction value generator 515, from among the correction value information stored in the look-up tables (FIGS. 6A, 6B and 6C), and may provide the extracted correction value information to the target position calculator 514.

In addition, when the correction value information corresponding to the acquired posture information on the moving unit (or posture difference thereof) is not stored in the look-up tables (FIGS. 6A, 6B and 6C), the correction value generator 515 may calculate an approximate correction value using the correction value information in the look-up tables (FIGS. 6A, 6B and 6C).

For example, the correction value generator 515 may store a function, an algorithm, or a program for calculating an approximate correction value using the look-up tables.

Figure 13:
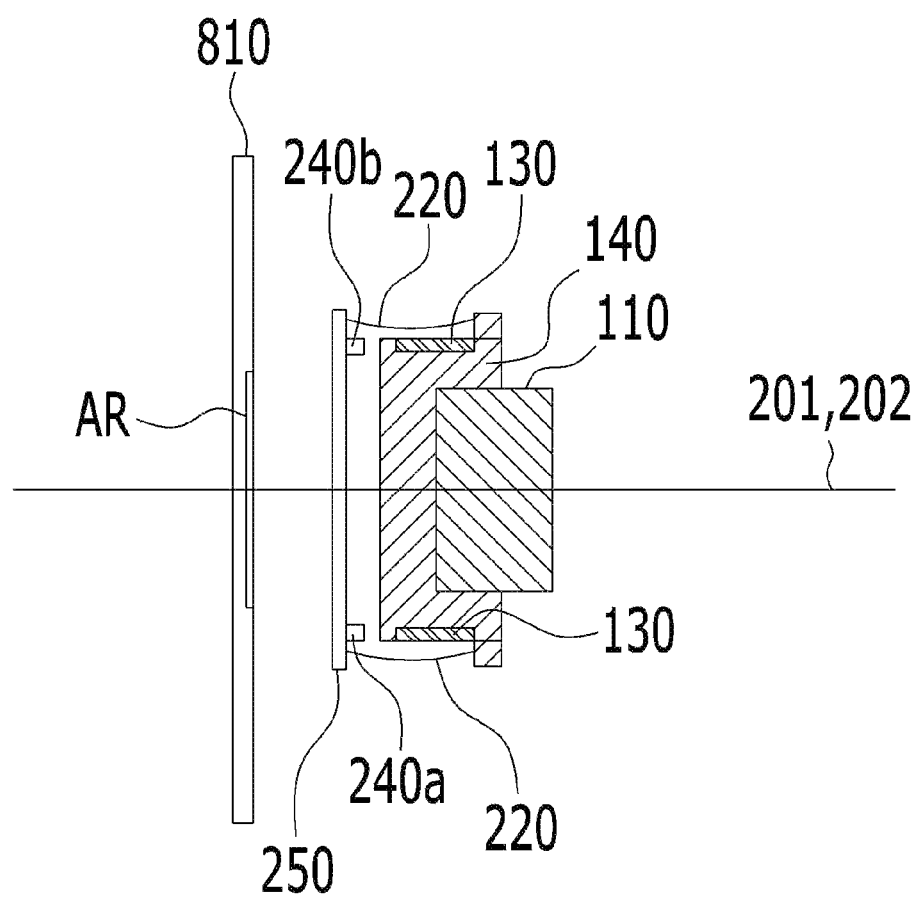
FIG. 13 illustrates the state in which the posture difference of the moving unit is corrected by the hand-tremor controller.

FIG. 13 illustrates the state in which the posture difference of the moving unit is corrected by the hand-tremor controller 510.

Referring to FIG. 13, the hand-tremor controller 510 may move and/or tilt the moving unit based on the correction value GA so that the position of the optical center of the moving unit at the posture difference position (e.g. $\theta z = 90$ degrees) of the moving unit coincides with the position of the optical center of the moving unit at the reference position (e.g. $\theta z = 90$ degrees).

For example, the hand-tremor controller 510 may control the driving signal provided to the OIS coil 230 of the moving unit based on the correction value GA, thereby controlling the electromagnetic force generated by interaction between the OIS coil 230 and the magnet 130 and compensating for tilting or sagging of the moving unit at the posture difference position of the moving unit due to gravity using the controlled electromagnetic force.

As described with reference to FIG. 5, in the process of compensating for hand tremor, it is possible to compensate for deviation of the optical center of the lens due to sagging of the lens-moving unit attributable to gravity using the correction value.

For example, the hand-tremor controller 510 may calculate target position information for hand-tremor compensation using the correction value, thereby compensating for deviation of the optical center of the moving unit due to tilting of the moving unit attributable to gravity.

Figure 14:
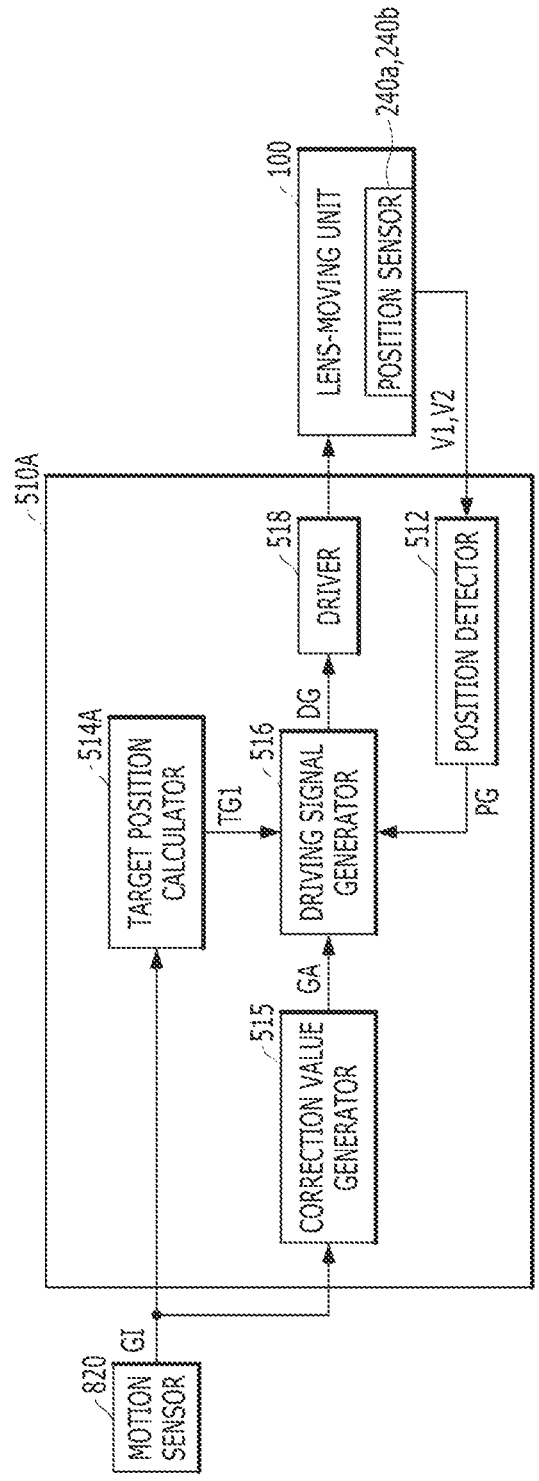
FIG. 14 illustrates a hand-tremor controller according to another embodiment.

FIG. 14 illustrates a hand-tremor controller 510A according to another embodiment.

The same reference numerals as those in FIG. 5 denote the same components, and a description of the same components will be made briefly or omitted.

Referring to FIG. 14, a hand-tremor controller 510A may include a position detector 512, a correction value generator 515, a target position calculator 514A, a driving signal generator 516, and a driver 518.

In another embodiment, the hand-tremor controller 510 first corrects tilting of the moving unit 100 due to gravity based on the correction value GA acquired by the correction value generator 515.

For example, the driving signal generator 516 may generate a first control signal for controlling the driver 518 using the correction value GA, and the driver 518 may control electromagnetic force between the OIS coil 230 and the magnet 130 of the lens-moving unit 100 in response to the first control signal, thereby correcting tilting of the moving unit due to gravity.

Subsequently, in the state in which tilting attributable to gravity is corrected, the target position calculator 514A may calculate target position information TG1 for hand-tremor compensation using the position information GI on the camera module 200 (or the optical device) provided from the motion sensor 820 in order to compensate for hand tremor of a user or the like.

In addition, the driving signal generator 516 may generate a driving control signal DG using the calculated target position information TG1 and the position information PG on the moving unit provided from the position detector 512. In addition, the driver 518 may control the electromagnetic force between the OIS coil 230 and the magnet 130 of the lens-moving unit 100 based on the driving control signal DG to control movement of the moving unit in the X-axis direction and/or movement of the moving unit in the Y-axis direction, thereby compensating for hand tremor.

Even if a posture difference of the moving unit occurs due to the movement of the camera module 200 (or the optical device) (e.g. θz=90 degrees), the embodiment is capable of correcting tilting of the moving unit due to gravity using the hand-tremor controller 510, thereby preventing deterioration in optical characteristics, e.g. the resolution, of the camera module (or the optical device) due to deviation of the optical center of the moving unit attributable to gravity during hand-tremor compensation.

In addition, in a camera module having two or more cameras including a lens-moving unit having an OIS function and a lens-moving unit having no OIS function, when posture differences of the lens-moving units occur, a moving unit of only the lens-moving unit having an OIS function may be tilted by gravity, which may increase tilting between the lens-moving unit having an OIS function and the lens-moving unit having no OIS function, leading to great deterioration in the performance of a dual camera capable of realizing bokeh control.

However, since the camera module according to the embodiment is capable of correcting tilting due to the posture difference of the OIS lens-moving unit, the relative tilt between a lens-moving unit having an OIS function and a lens-moving unit having no OIS function may be improved, and accordingly bokeh control performance may be improved.

As described with reference to FIGS. 6A to 6C, the correction value information stored in the look-up tables may be a correction value of the moving unit, variation in the optical center of the moving unit, and/or default variation, without being limited thereto.

In another embodiment, the look-up tables may store the default variation and the position (e.g. the first coordinate value) of the optical center of the moving unit at the reference position. In addition, the hand-tremor controller may acquire posture information on the moving unit using sensing information provided from the motion sensor 820.

In addition, the hand-tremor controller acquires the position of the optical center of the moving unit in real time based on the acquired posture information on the moving unit (posture difference thereof), and stores the coordinate value of the acquired position of the optical center of the moving unit in the memory. The method of acquiring the second coordinate value, described with reference to FIG. 10, may be equally or similarly applied to the method of acquiring the position of the optical center of the moving unit in real time.

Subsequently, the hand-tremor controller may acquire a correction value using the position (e.g. the first coordinate value) of the optical center of the moving unit at the reference position and the default variation, which are stored in the look-up tables, and using the position (e.g. the second coordinate value) of the optical center of the moving unit stored in the memory.

For example, variation in the optical center of the moving unit may be acquired using the first coordinate value and the second coordinate value, and a correction value may be acquired using the variation in the optical center of the moving unit and the default variation. The method described with reference to FIGS. 8 and 11 may be equally or similarly applied to the correction value calculation method.

In addition, the camera module 200 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 15:
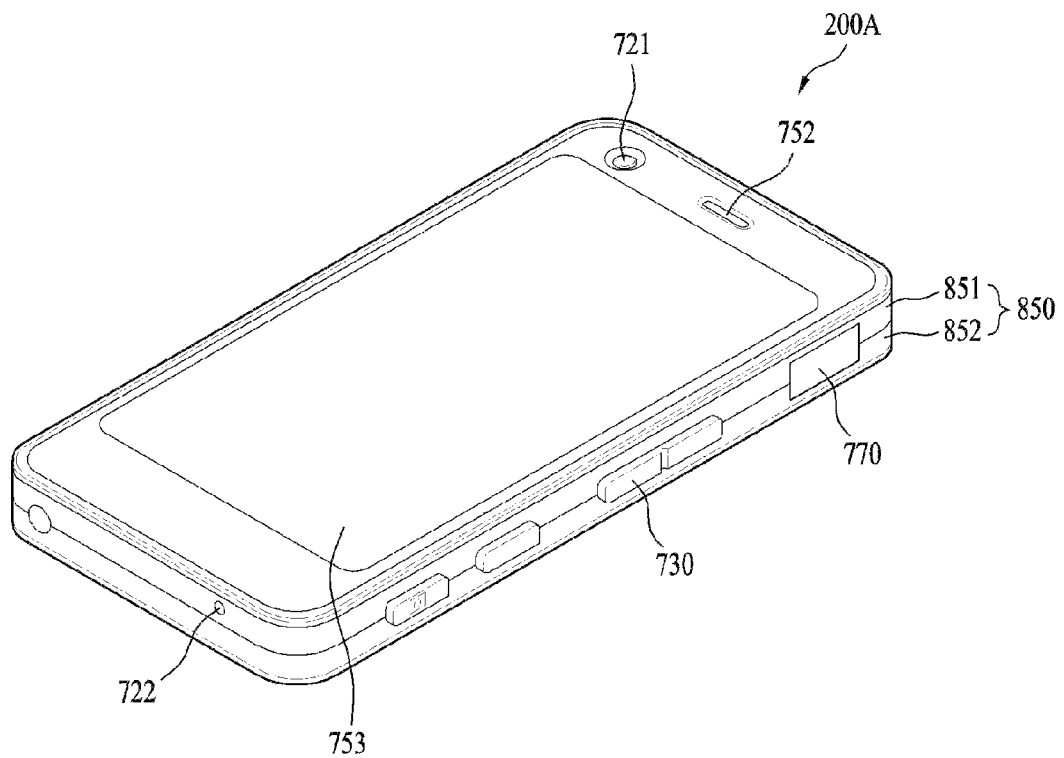
FIG. 15 is a perspective view of a portable terminal according to an embodiment.
Figure 16:
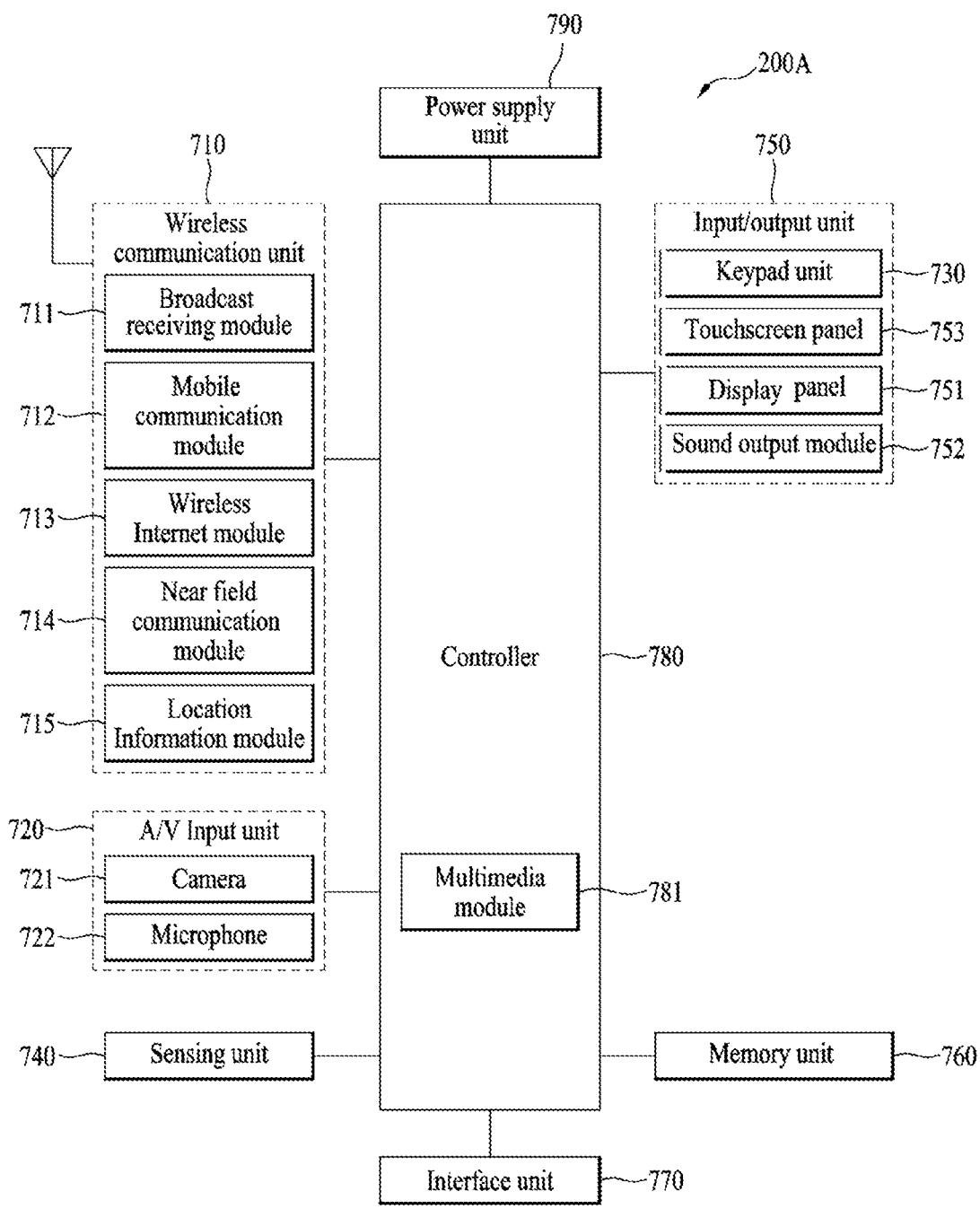
FIG. 16 is a configuration diagram of the portable terminal shown in FIG. 15.

FIG. 15 is a perspective view of a portable terminal 200A according to an embodiment, and FIG. 16 is a configuration diagram of the portable terminal shown in FIG. 15.

Referring to FIGS. 15 and 16, the portable terminal 200A (hereinafter referred to as a "terminal") may include a body 850, a wireless communication unit 710, an A/V input unit 720, a sensor 740, an input/output unit 750, a memory 760, an interface 770, a controller 780, and a power supply 790.

The body 850 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. For example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the terminal 200A and a wireless communication system or between the terminal 200A and a network in which the terminal 200A is located.

For example, the wireless communication unit 710 may include a broadcast reception module 711, a mobile communication module 712, a wireless Internet module 713, a nearfield communication module 714, and a position information module 715.

The audio/video (A/V) input unit 720 serves to input audio signals or video signals, and may include a camera 721 and a microphone 722.

The camera 721 may include the camera module 200 according to the embodiment.

The sensor 740 may sense the current state of the terminal 200A, such as the open or closed state of the terminal 200A, the position of the terminal 200A, the presence or absence of a user's touch, the orientation of the terminal 200A, or the acceleration/deceleration of the terminal 200A, and may generate a sensing signal to control the operation of the terminal 200A. For example, when the terminal 200A is a slide-type phone, whether the slide-type phone is open or closed may be detected. In addition, the sensor 740 serves to sense whether power is supplied from the power supply 790 or whether the interface 770 is coupled to an external device.

In addition, the sensor 740 may include a motion sensor configured to output rotational angular speed information and acceleration information according to motion of the portable terminal 200A, and the motion sensor may include a 3-axis gyro sensor, an angular speed sensor, and/or an acceleration sensor.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface 770 serves as a passage for connection between the terminal 200A and an external device. The interface 770 may receive data or power from the external device, and may transmit the same to respective components inside the terminal 200A, or may transmit data inside the terminal 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the general operation of the terminal 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touch-screen is perceived as characters or images.

The power supply 790 may supply power required to operate the respective components upon receiving external power or internal power under the control of the controller 780.

The features, structures, effects and the like described above in the embodiments are included in at least one embodiment of the present disclosure, but are not necessarily limited to only one embodiment. Furthermore, the features, structures, effects and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

The embodiments may be used in a camera module and an optical device capable of compensating for deviation of the optical center of a lens-moving unit due to gravity during hand-tremor compensation, thus preventing deterioration in resolution and improving the accuracy of hand-tremor compensation.

The invention claimed is:

1. A camera module, comprising:
an image sensor;
a moving unit comprising a lens, the moving unit being disposed on the image sensor;
a fixing unit;
a motion sensor;
an elastic member interconnecting the fixing unit and the moving unit; and
a controller configured to, when the moving unit is tilted by gravity, acquire posture information on the moving unit using sensing information of the motion sensor, and acquire a correction value to compensate for an extent of tilting of the moving unit using the posture information and to control movement of the moving unit using the correction value, and
wherein the posture information on the moving unit comprises a tilt angle of a reference axis at a current position of the moving unit with respect to the reference axis at a reference position, and the reference position is a position at which the reference axis, perpendicular to a sensor surface of the image sensor, is parallel to a direction of gravity.

2. The camera module according to claim 1, comprising:
a memory storing correction value information on the moving unit corresponding to the posture information on the moving unit,
wherein the controller compensates for the extent of tilting of the moving unit.

3. The camera module according to claim 2, wherein the correction value information on the moving unit stored in the memory comprises at least one of the extent of tilting of the moving unit and a variation in a position of an optical center of the moving unit.

4. The camera module according to claim 2, wherein the controller comprises a look-up table storing correction value information corresponding to preset respective pieces of posture information on the moving unit, and
wherein the controller is configured to acquire the correction value of the moving unit corresponding to the acquired posture information on the moving unit using the look-up table.

5. The camera module according to claim 4, wherein the correction value information comprises a tilt angle of the moving unit.

6. The camera module according to claim 4, wherein the correction value information comprises variation between a position of the optical center of the moving unit at the reference position and the position of the optical center of the moving unit at the current position.

7. The camera module according to claim 6, wherein the correction value information comprises default variation, which is variation in the position of the optical center of the moving unit when the moving unit is tilted by a reference angle in the direction of gravity in the preset posture information.

8. The camera module according to claim 1, wherein the controller controls the moving unit to move in a direction perpendicular to an optical axis in order to perform hand-tremor compensation.

9. The camera module according to claim 8, wherein, during the hand-tremor compensation, the correction value is used to compensate for hand tremor.

10. The camera module according to claim 8, wherein the controller compensates for the extent of tilting of the moving unit, and performs the hand-tremor compensation.

11. The camera module according to claim 8, wherein, in order to perform the hand-tremor compensation, the controller calculates target position information on the moving unit using the correction value, acquires current position information on the moving unit, acquires error information for hand-tremor compensation based on the target position information and the current position information on the moving unit, and controls the moving unit to move in a direction perpendicular to the optical axis based on the error information.

12. The camera module according to claim 1, wherein the controller receives acceleration information on the camera module and acquires the posture information on the moving unit using the received acceleration information on the camera module.

13. The camera module according to claim 1, wherein the controller is configured to acquire the extent of tilting of the moving unit using Z-axis acceleration of the camera module.

14. The camera module according to claim 1, comprising an OIS position sensor disposed at the fixing unit and configured to output an output signal in response to a result of sensing the movement of the moving unit in a direction perpendicular to the optical axis to the controller.

15. The camera module according to claim 14, wherein the controller is configured to acquire the current position information on the moving unit based on the output signal of the OIS position sensor.

16. The camera module according to claim 1, wherein the controller comprises:
a correction value generator configured to generate the correction value using the acquired posture information on the moving unit;
a target position calculator configured to calculate target position information on the moving unit based on the correction value;
a position detector configured to detect position information on the moving unit;
a driving signal generator configured to generate a driving control signal using the target position information on the moving unit and the position information on the moving unit; and
a driver configured to control the movement of the moving unit in a direction perpendicular to the optical axis based on the driving control signal.

17. An optical device comprising the camera module according to claim 1.

18. The camera module according to claim 1, further comprising a support member coupled to the elastic member,
wherein the elastic member and the support member are configured to support the moving unit, and
wherein the extent of tilting of the moving unit is an extent of bending of the support member at a preset posture difference position with respect to the support member at the reference position at which there is no posture difference.

19. A camera module, comprising:
an image sensor;
a moving unit comprising a lens, the moving unit being disposed on the image sensor;
a fixing unit;
a motion sensor;
an elastic member interconnecting the fixing unit and the moving unit;
a memory storing correction value information on the moving unit corresponding to a posture information on the moving unit; and
a controller configured to control movement of the moving unit using the correction value information,
wherein the correction value information is for compensating for sagging of the moving unit due to gravity at a position corresponding to the posture information,
wherein controller is configured to acquire the posture information using sensing information of the motion sensor, and
wherein the posture information on the moving unit comprises a tilt angle of a reference axis at a current position of the moving unit with respect to the reference axis at a reference position, and the reference position is a position at which the reference axis, perpendicular to a sensor surface of the image sensor, is parallel to a direction of gravity.

20. The camera module according to claim 19, further comprising a support member coupled to the elastic member,
wherein the elastic member and the support member are configured to support the moving unit, and wherein an extent of the sagging of the moving unit is an extent of bending of the support member at a preset posture difference position with respect to the support member at the reference position at which there is no posture difference.

* * * * *